US008264166B2

(12) United States Patent
Kuo

(10) Patent No.: US 8,264,166 B2
(45) Date of Patent: Sep. 11, 2012

(54) AMP CONTROL SYSTEM BY CONTROLLING OUTPUTS OF A BUCK DC-DC CONVERTER

(76) Inventor: Chien-Chih Kuo, Taipei (TW)

( * ) Notice: Subject to any disclaimer, the term of this patent is extended or adjusted under 35 U.S.C. 154(b) by 283 days.

(21) Appl. No.: 12/775,461

(22) Filed: May 6, 2010

(65) Prior Publication Data
US 2011/0273097 A1 Nov. 10, 2011

(51) Int. Cl.
G05F 1/00 (2006.01)
H05B 37/02 (2006.01)
H05B 39/04 (2006.01)
H05B 41/36 (2006.01)

(52) U.S. Cl. ......... 315/291; 315/302; 315/307; 315/308

(58) Field of Classification Search .............. 315/209 R, 315/224–225, 291, 302, 307–308, DIG. 7
See application file for complete search history.

(56) References Cited

U.S. PATENT DOCUMENTS
2006/0138973 A1* 6/2006 Hirosawa ...................... 315/291
2011/0037402 A1* 2/2011 Ozasa et al. .................. 315/246
* cited by examiner Primary Examiner — Anh Tran

(57) ABSTRACT

A lamp control system includes at least one lamp structure; comprising: a lamp body; a ballast connected to the lamp body; the ballast including: a first stage for converting AC current into DC current and boosting of voltage; a buck DC-DC converter; a transistor of the buck DC-DC converter having an input end; a PWM controller being installed between an output end of the lamp body and the input end of the transistor; a frequency controllable oscillator being connected to the PWM controller and an oscillation controlling processor being connected to the frequency controller oscillator for generating instructions to change the oscillation frequency of the oscillator and thus to adjust the modulation frequency of the PWM controller; sensors about voltages, currents, and illuminations are installed for light strength control, temperature control, auto-turning on and off of the HID lamp, power control and time and illumination control.

11 Claims, 16 Drawing Sheets

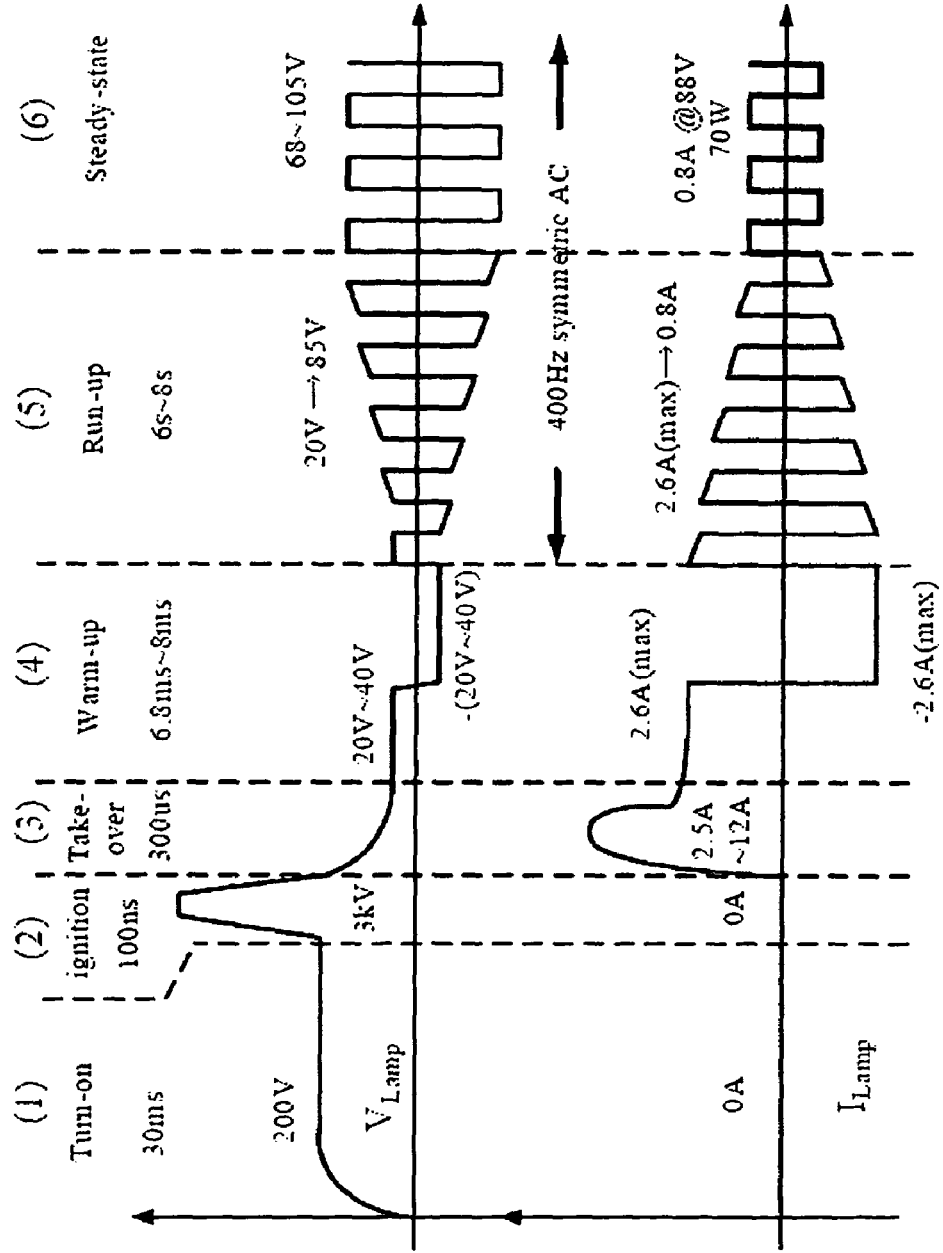

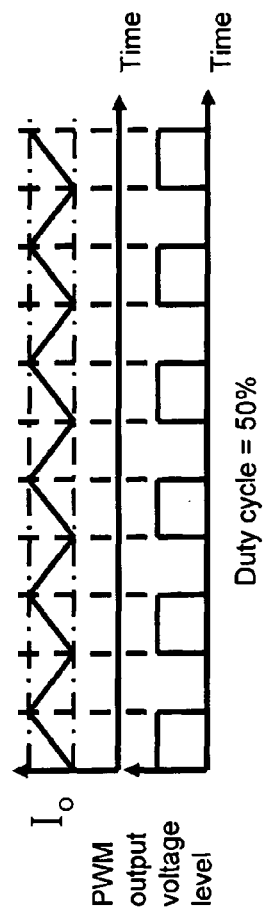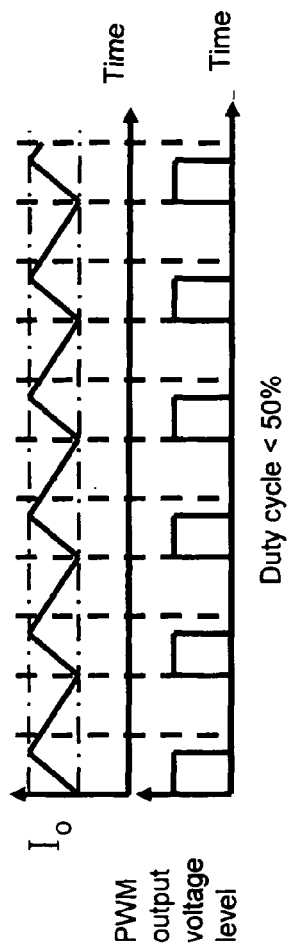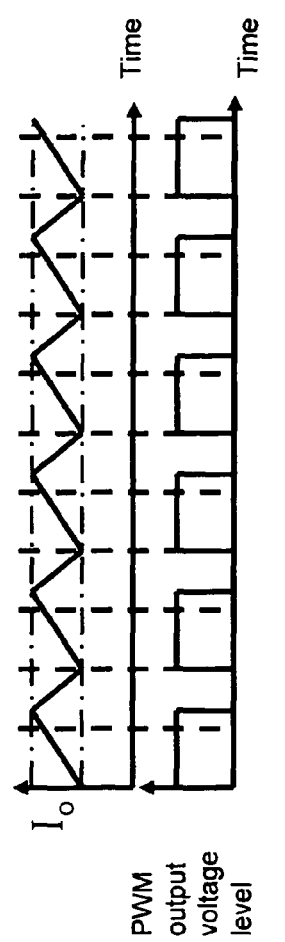

AMP CONTROL SYSTEM BY CONTROLLING OUTPUTS OF A BUCK DC-DC CONVERTER

FIELD OF THE INVENTION

The present invention is related to lamps, and in particular to a lamp control system by controlling outputs of a buck DC-DC converter. Furthermore, sensors about voltages, currents, and illuminations are installed for light strength control, temperature control, auto-turning on and off of the HID lamp, power control and time and illumination control.

BACKGROUND OF THE INVENTION

With reference to FIG. 1, the relation of the voltage with respect to time of the actuation of an HID lamp is illustrated. In FIG. 2, the relation of the current with respect to time of the actuation of the HID lamp is illustrated. When the HID lamp is actuated, the internal gas will convert to a form of plasma. The voltage between two electrodes of the lamp tube will operate with a specific range. When the HID lamp is steady, the light efficiency of the HID lamp is controlled by adjusting the current, while the variation of the voltage between the two electrodes is small.

The power sources of the HID lamps may be AC source or DC source. After an HID lamp is light up, to sustain the temperature between the two electrodes, if the temperature of the electrodes descends too quickly, the electrons cannot be stimulated. Then the HID lamp will distinguish.

To control the HID lamp lights efficiency is to adjust the input current of the HID lamp. Generally, an HID lamp is an intrinsic light efficiency. The control process is that to actuate the HID lamp with a normal light efficiency. After the HID lamp is steady, the input current is adjusted to control the light efficiency of the HID lamp.

However, this control way needs to change the structure of the ballast of the HID lamp, while this is inconvenient.

SUMMARY OF THE INVENTION

The object of the present invention is to provide a lamp control system by controlling the buck DC-DC converter. Furthermore, sensors about voltages, currents, illuminations are installed for light strength control, temperature control, auto-turning on and off of the HID lamp, power control and time and illumination control.

To achieve above object, the present invention provides a lamp control system mainly by controlling outputs of a buck DC-DC converter; comprising: at least one lamp structure; comprising: a lamp body; a ballast connected to the lamp body; the ballast including: a first stage for converting AC current into DC current and boosting of voltage; a buck DC-DC converter; a transistor of the buck DC-DC converter having an input end which is selected from a gate for MOSFET and a base for a bipolar transistor; a PWM controller being installed between an output end of the lamp body and the input end of the transistor; a frequency controllable oscillator being connected to the PWM controller for providing variable frequency to the PWM controller and an oscillation controlling processor being connected to the frequency controller oscillator for generating instructions to change the oscillation frequency of the frequency controller oscillator and thus to adjust the modulation frequency of the output of the PWM controller; and an igniter for triggering the lamp body to light up; a lamp controller for controlling the lamp body; a first illumination sensor connected to the lamp controller so that the lamp controller can adjust the illumination of the lamp body.

The various objects and advantages of the present invention will be more readily understood from the following detailed description when read in conjunction with the appended drawing.

BRIEF DESCRIPTION OF THE DRAWINGS

FIG. 1 shows the relationship of the HID lamp actuation voltage versus time.

FIG. 2 shows the relationship of the HID lamp actuation current versus time.

FIGS. 3-1 and 3-2 show the functional block of an HID ballast, where FIG. 3-1 is suitable for an AC HID lamp and FIG. 3-2 shows a DC HID lamp.

FIG. 9 shows the relationship of PWM control with a fixed load.

FIG. 10 shows the relation of PWM control with a reduced load.

FIG. 11 shows the relationship of PWM control with an enlarged load.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The structure of the present invention will be described herein with reference to the attached drawings. The present invention is suitable for AC or DC driving lamps. However, in the following the AC driving HID lamp is used in the description of the invention, while this is only a preferred embodiment, but it is not used to confine the scope of the present invention.

Figures 1, 3:
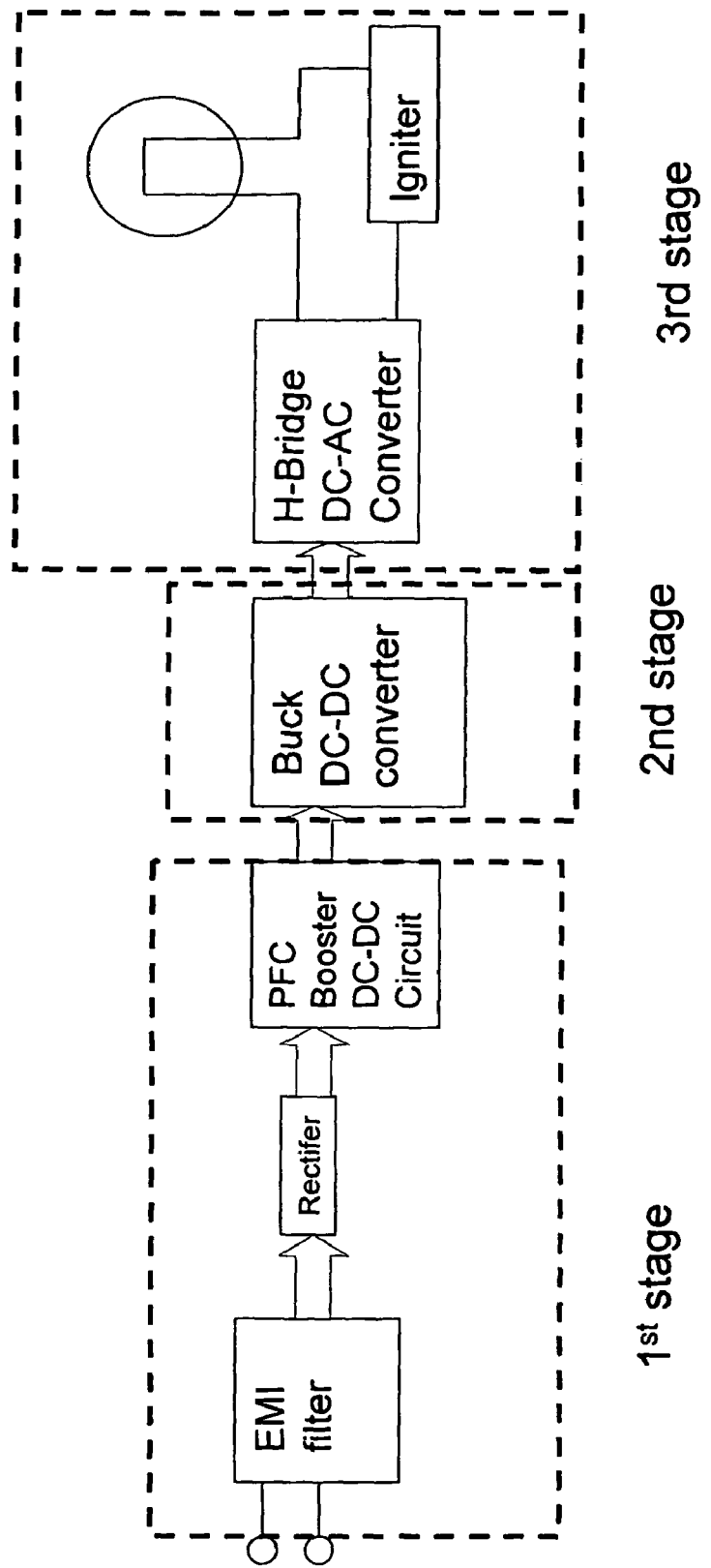
Figures 2, 3:
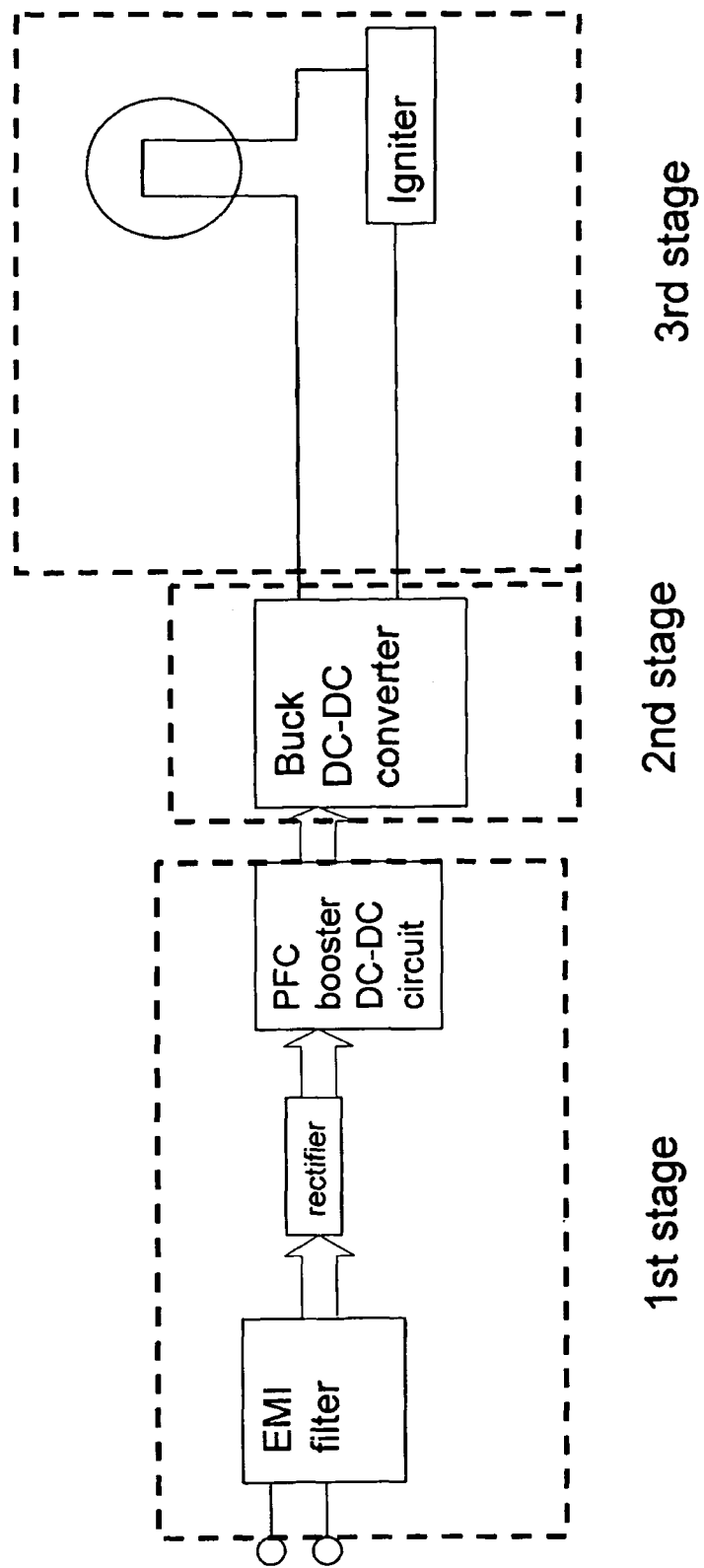

With reference to FIGS. 3-1 and 3-2, the internal structure of an HID ballast if illustrated. The structure in FIG. 3-1 is suitable for AC driving HID lamp. FIG. 3-2 shows a DC driving HID lamp. Since most HID lamp is driven by AC signal, general public power source has voltages between 110 to 240V which can not be provide to HID lamps. Thus the voltage adjust ballasts are necessary.

Generally, the basic structure of an electronic ballast has three main sections.

A first stage is a rectified voltage boost PFC control stage (AC to DC control). At this stage, AC current is converted into DC current and the voltage is boosted based on the actuating voltage of the HID lamp and an igniter circuit. As illustrated in FIG. 1, in a classic embodiment, this stage has an EMI (electromagnetic interference) filter, a rectifier, and a voltage booster PFC for promoting conversion efficiency from AC to DC. A rear end of the ballast has an igniter for providing a transient high voltage. Thus other than conversion from AC to DC, a front end of the ballast has a voltage booster for providing boosting voltage to the igniter.

A second stage is a buck DC-DC converter for conversion low DC voltage to high DC voltage so as to control the light efficiency of the HID lamp. The conversion of DC to DC is mainly the control of current. The lighting efficiency of the HID lamp is controlled by current. Actuation of HID lamp needs high voltage. When the HID lamp enters into a steady operation, the driving voltage is farther lower than the voltage in actuation. Thus, the output voltage of the buck DC-DC converter in the second stage is variable. Since in steady state, the controlling the HID lamp is mainly by current, a current controlling buck DC-DC converter is used at this stage.

A third stage is AC HID lamp full bridge output control (DC to AC) and an igniter for converting DC to AC to drive the HID lamp. If the HID lamp is DC driving, only the igniter is used. The current and voltage of the HID lamp is controlled by the second stage.

Figure 4:
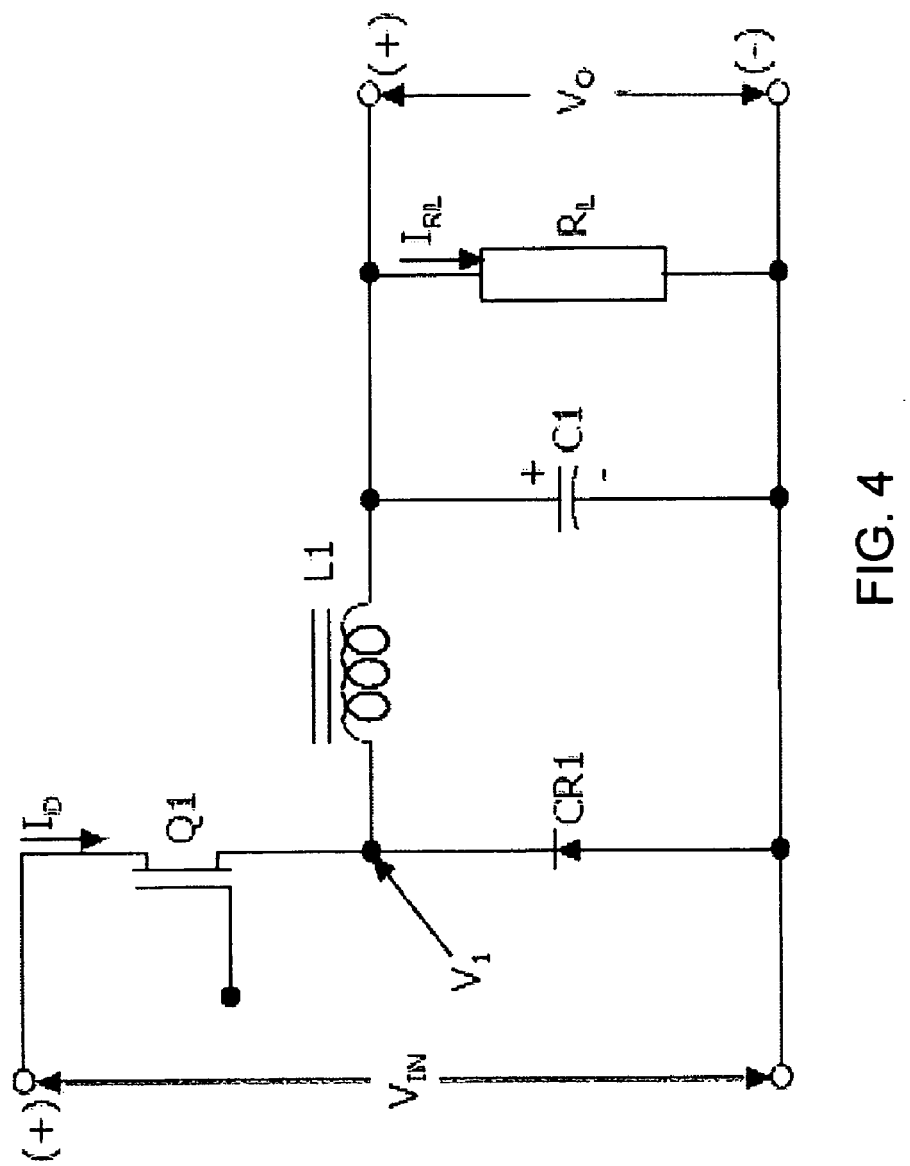
FIG. 4 is a simple circuit for a buck DC-DC converter.

FIG. 4 shows a simple circuit model of the buck DC-DC converter. The buck DC-DC converter includes a transistor Q1 (such as a bipolar transistor or a field effect transistor), which is used as a power switch. A current I enters into an input end of the transistor. The output end of the transistor includes an LRC circuit for adjusting the current and the voltage. In this example, the LRC current includes a series connected diode D1, and an inductor L1 connected to the diode D1. An output end of the inductor is further connected to a capacitor C1 and a load resistor RL. The charging and discharging of the capacitor and the inductor are controlled by switching the transistor Q1 so as to have the effect of voltage boosting. Generally, the output current and voltage are feedback to the input end so as to switch the transistor periodically and thus to control the duty cycle of pulse output from the transistor. Thus the voltage is controlled.

Figure 5:
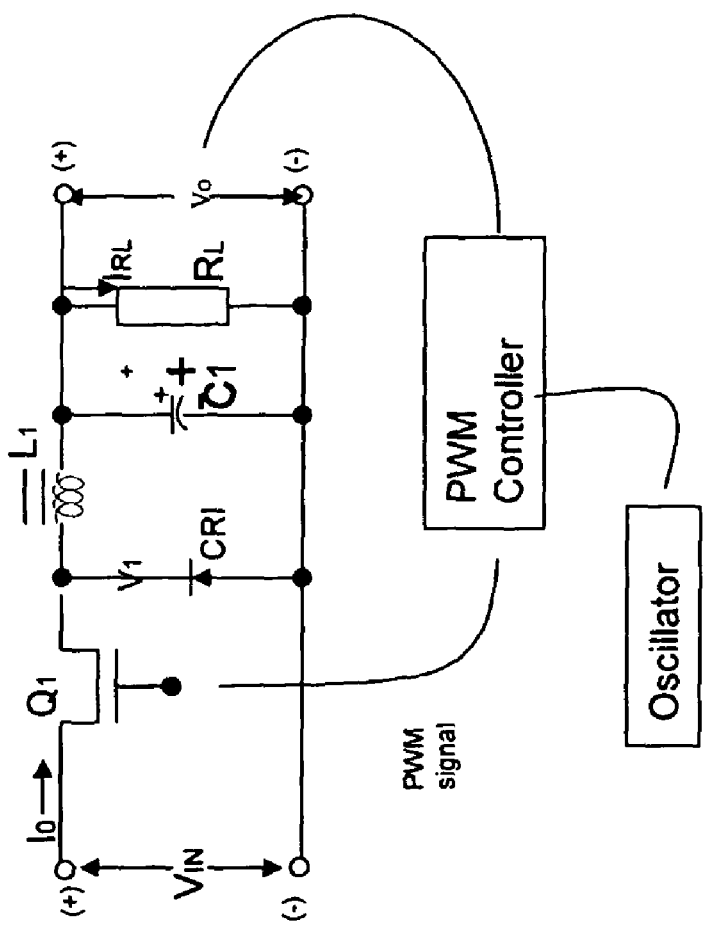
FIG. 5 shows a circuit, where a buck DC-DC converter is serially connected to a PWM controller and an oscillator is used to provide base band signals to the PWM controller.

With reference to FIG. 5, it is illustrated that a PWM (pulse width modulation) controller is serially connected between the buck DC-DC converter and the transistor Q1 for controlling the switching signal from PWM controller to the transistor so as to control the output power. An oscillator serves to provide a base band signal to the PWM controller. The PWM controller receives the feedback signal from the load end so as to modulate the pulse width in the PWM controller. The output of the PWM controller is transferred to the buck DC-DC converter as a working signal. The duration of the pulse width will control the charge and discharge time period of the capacitor and the inductor so as to change the voltage, current and power at the output end. Thus the illumination of the HID lamp is controlled.

Figure 7:
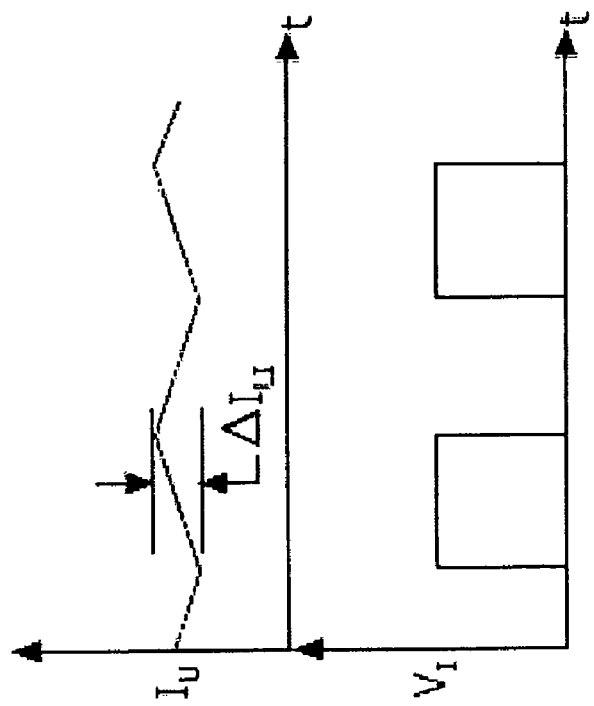
FIG. 7 shows the current states for the elements in FIG. 5.
Figure 6:
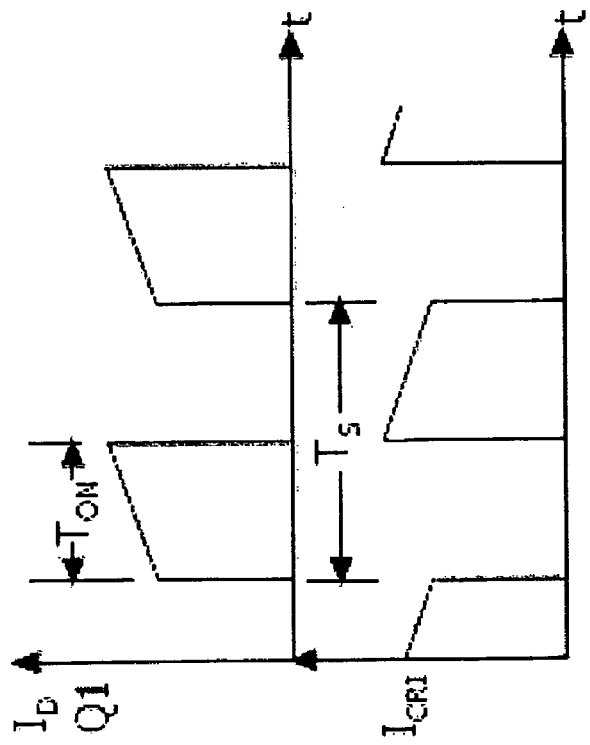
FIG. 6 shows the current states of the elements in FIG. 5.

Referring to FIGS. 6 and 7, the current states of the elements in FIG. 5 are shown. The duty cycle at the output signal of the PWM controller is controlled by the voltage difference, current or power at the output end of the buck DC-DC converter (since the light property of the HID lamp is driven by current). The output current is detected by a current sensor. In the drawing, Iu represents the current passing through the inductor L1. V1 shows the state at the input end of the inductor L1, that is, the switching state of transistor Q1.

When transistor Q1 conducts, the input current of the V1 point will flow through the inductor L1. The output current will increase. When the current increase to a limit value, the transistor Q1 will be turned off. Then the energy stored in the inductor L1 will supply to the output end. Then the output current decreases. When the current decreases a low limit, the transistor Q1 conducts again so make the L1 to store energy. This cycle performs repeatedly to sustain the operation of the circuit.

Since the lighting property of the HID lamp is based on the driving current. In lighting, the voltage varies continuously within a great range. The feedback control of the buck DC-DC converter can be achieved by the following way.

In the buck DC-DC converter, the switching of the transistor Q1 is based on the setting of the current operation range. The feedback control of the current is for protecting the output current of the circuit from overloading and thus the load is not burnt out. The minimum of the current is based on the driving frequency so as to prevent insufficiency of power supply.

The factors about the feedback control of the buck DC-DC converter are the loading R1, the inductance of the inductor L1, the capacitance of the capacitor C1, the permissible current range, and the permissible voltage range, etc.

In the following, a brief description about the current feedback control is described.

In FIG. 5, it is illustrated that a PWM controller is added with an oscillator. The frequency of the PWM controller is generated by the oscillator. Then the current Iu is detected, the PWM controller outputs pulse width modulation signal based on the Iu.

Figure 8:
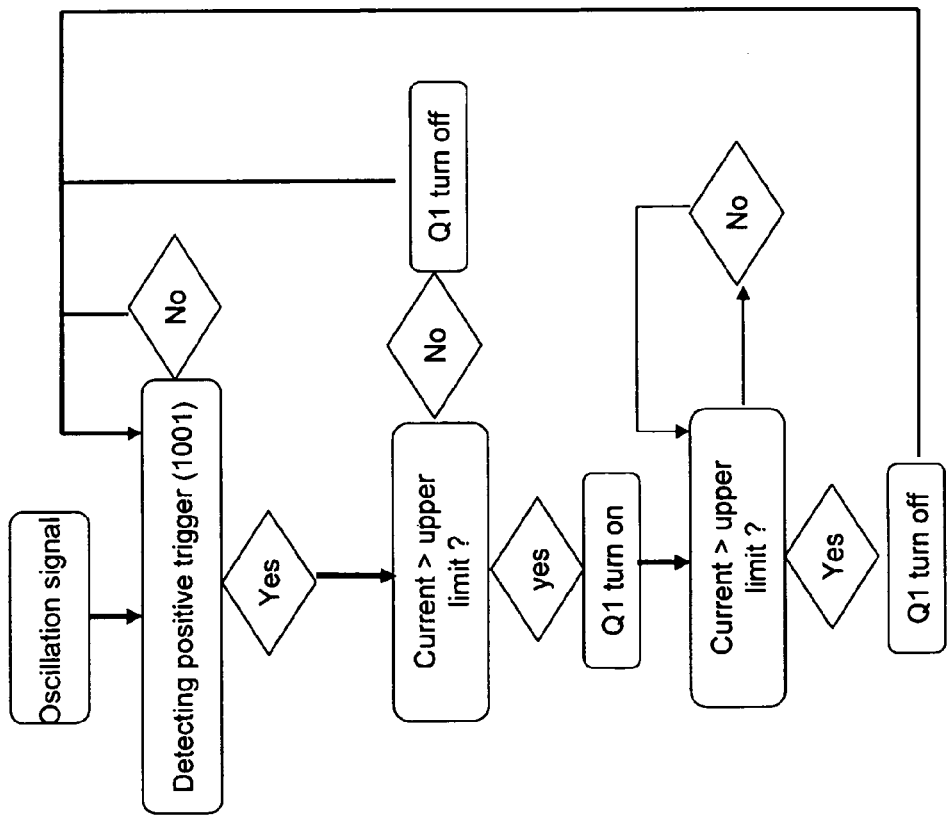
FIG. 8 is a flow diagram for a PWM controller to control the buck DC-DC converter.

FIG. 8 shows the flow diagram about the PWM signal for controlling the transistor Q1. The operation will be described herein. In that an oscillation signal is sent. The system detects whether it is a positive trigger (step 1001). If no, the process repeats. If yes, the system determine whether the current is greater than an upper limiter (step 1002), If Q1 is turned off and the process returns to the step 1001. If yes, Q1 will be turned on (step 1003) and then the system detects whether the current is greater than an upper limit, if no the process repeats. If Q1 turns off and the process returns to step 1001.

FIGS. 9 to 11 are schematic views about the control of the PWM control. In FIG. 9, it shows that the load is fixed. The relation between the PWM output voltage and the output current Io of the buck DC-DC converter is illustrated. In FIG. 10, it shows that the duty cycle becomes smaller than 50%. The charge time of the capacitor C1 is shortened and the discharge time is prolonged. In FIG. 11, it shows that the duty cycle becomes greater than 50%. The charge time of the capacitor C1 is prolonged and the discharge time is shortened.

Figure 12:
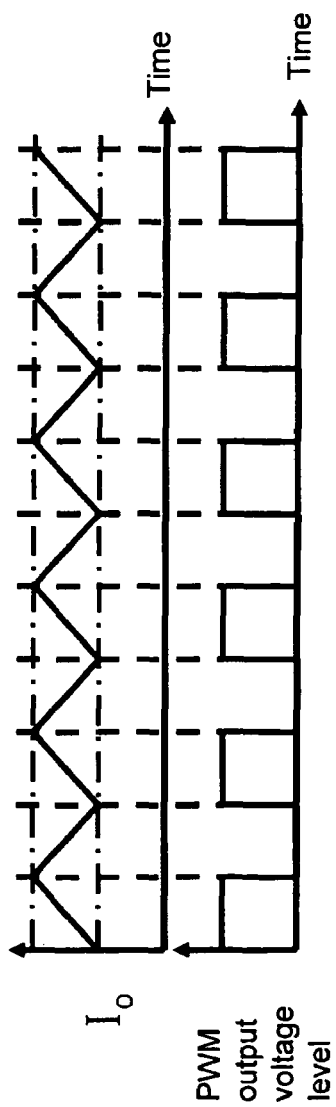
FIG. 12 shows the relationship of current versus time, where the PWM control outputs a predetermined frequency.
Figure 13:
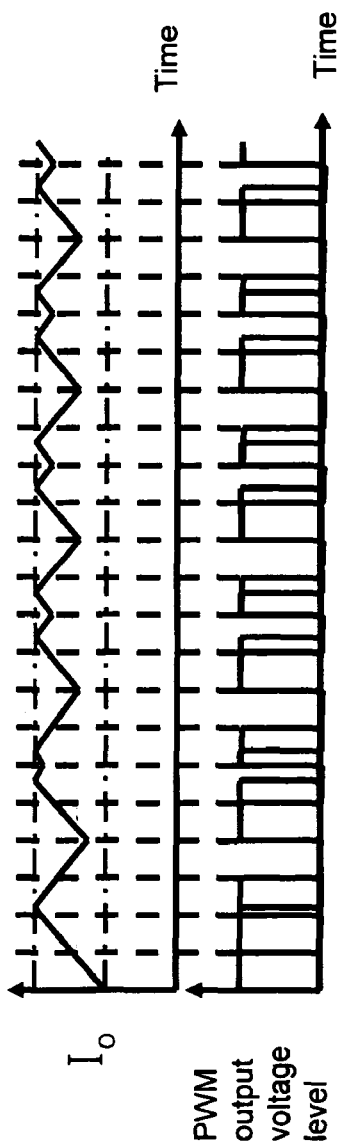
FIG. 13 shows the relationship of current versus time, where the output frequency of the PWM control is two time of that in FIG. 12.

FIGS. 12 and 13 shows that the load, current limit, capacitor, and inductor are not changed. The duty cycle of the PWM controller is changed. The effect to the buck DC-DC converter 502 is illustrated. In FIG. 12, it shows that the load is fixed. In FIG. 13, the output frequency of the PWM controller is doubled. It is illustrated that the current level (Io) is higher.

The HID lamp is driven by current. When current becomes large, the power of the HID lamp becomes large. The PWM can effectively control the illumination of the HID lamp.

The present invention provides a structure to change the lighting efficiency of the HID lamp by controlling the baseband frequency of the PWM controller. The change of the baseband frequency of the PWM controller will change the duty cycle of the PWM signal so as to change the charging and discharging time period of the inductor L1 and the capacitor C1.

The way for controlling the PWM baseband signal according to the present invention will be described herein.

Figure 14:
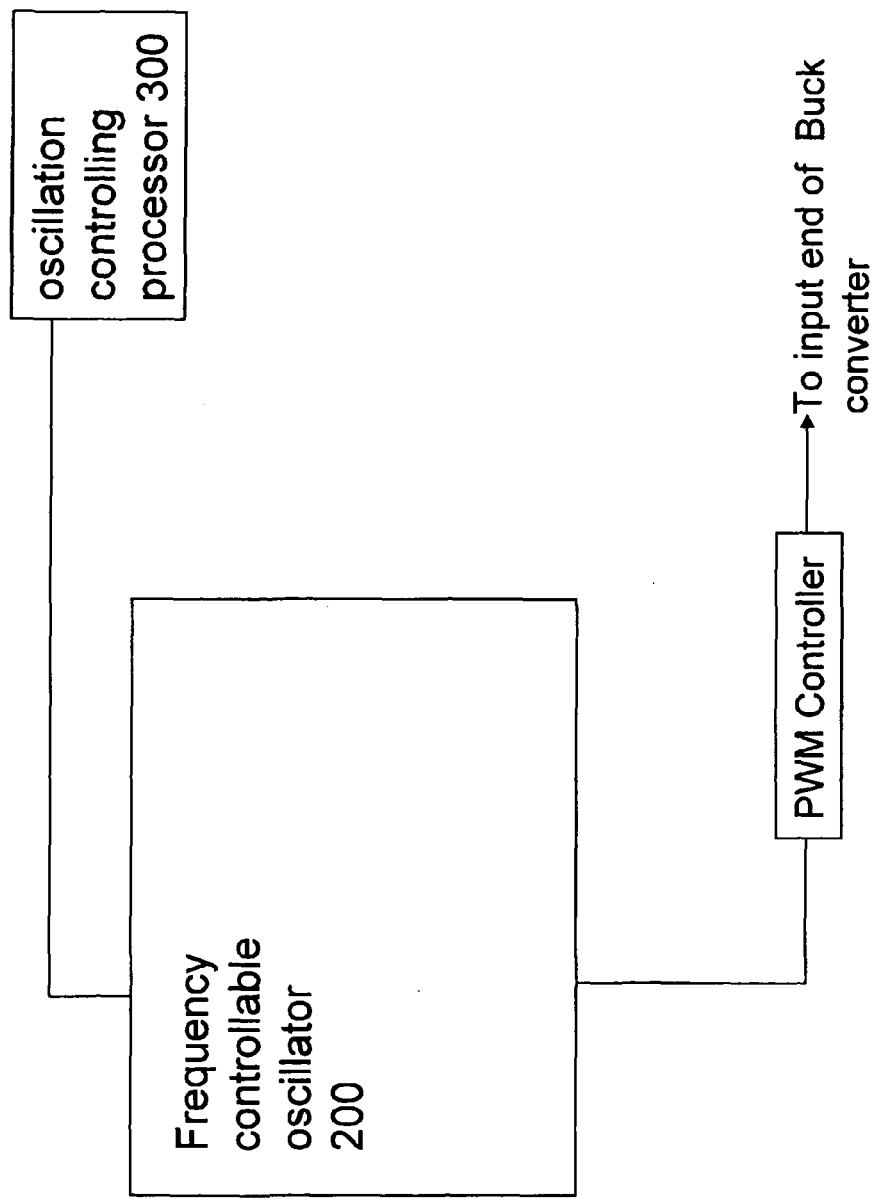
FIG. 14 shows that a frequency controllable oscillator and an oscillation controlling process are added to the PWM controller.

Referring to FIG. 14, a frequency controllable oscillator 200 is connected to the PWM controller for providing variable frequency to the PWM controller and an oscillation controlling processor 300 is connected to the frequency controller oscillator 200 for generating instructions to change the oscillation frequency of the frequency controller oscillator 200 and thus to adjust the modulation frequency of the output of the PWM controller.

See FIG. 14, in the present invention, the frequency controllable oscillator 200 is formed by an electronic oscillator 200 and an adjusting circuit. The electronic oscillator 210 is an LC (L: inductor; C: capacitor) oscillation circuit, that is: a manual made oscillator by electronic elements. The arrangement will be described here.

At this stage, the electronic oscillator 210 is connected with an adjusting circuit which includes at least one capacitors and at least one resistors.

There are three forms of the adjusting circuits.

Figure 15:
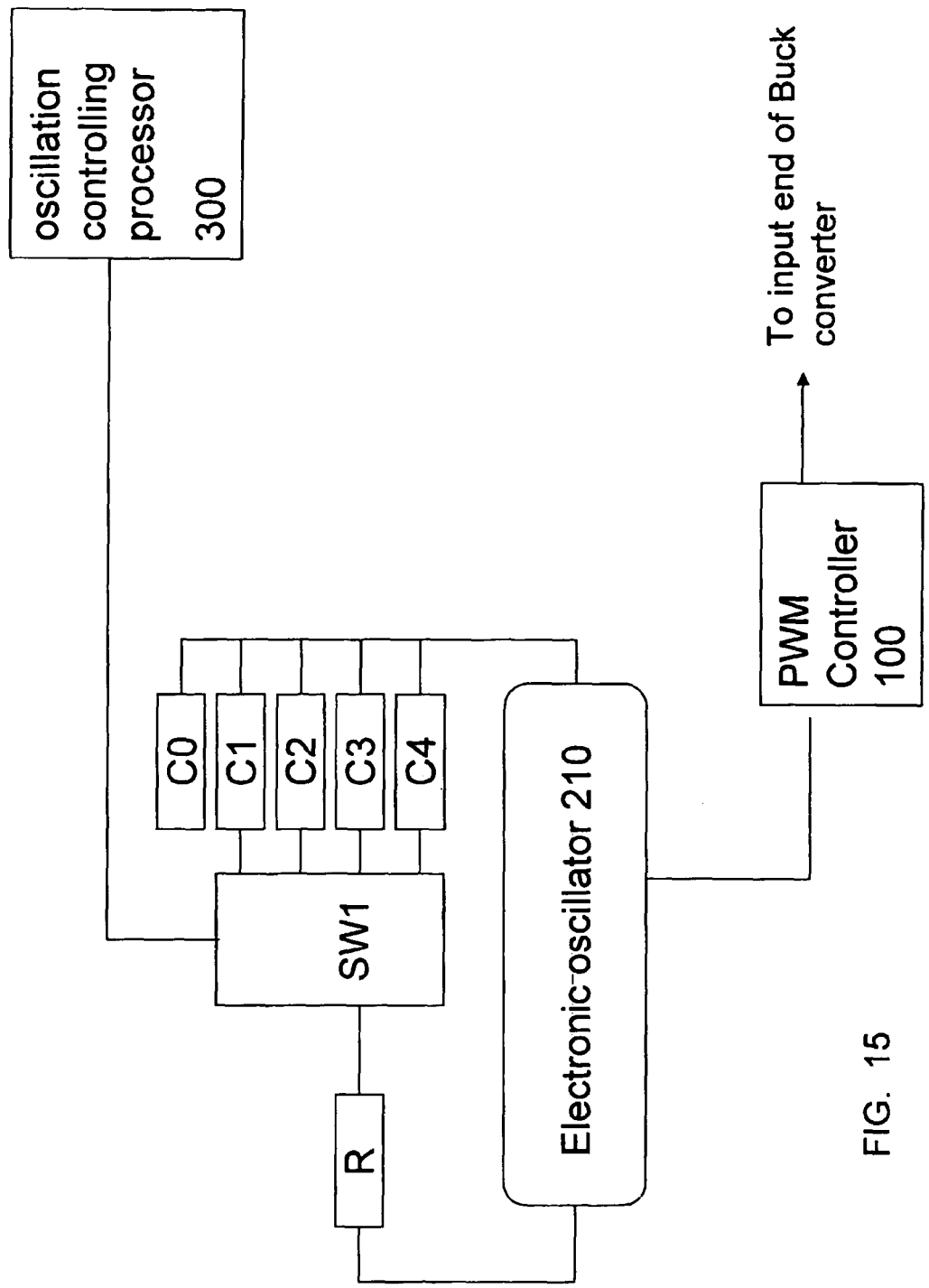
FIG. 15 shows the first operation mode for controlling the output of the buck DC-DC converter.

The first way is illustrated in FIG. 15, the adjusting circuit includes respective ends of a plurality of capacitors C0 to C4. Another ends of these capacitors are connected to one end of a capacitor switch SW1 in parallel. Another end of the capacitor switch SW1 is connected to one end of a resistor R. Another end of the resistor R is connected to another end of the electronic oscillator 210. By switching the capacitor switch SW1, only one of the capacitors C0 to C4 is connected to the resistor. The frequency of the oscillator is based on the RC value so that different assembly of R and C will cause the oscillator to generate different oscillation frequency. The capacitor switch SW1 is further connected to the oscillation controlling processor 300. The oscillation controlling processor 300 is built with a frequency control software which includes the logics for controlling the switching of the capacitor switch SW1 based on a desired effect of the HID lamp. Furthermore, the present invention provides a function for manually adjusting output frequencies of the electronic oscillator to get a desired effect.

Figure 16:
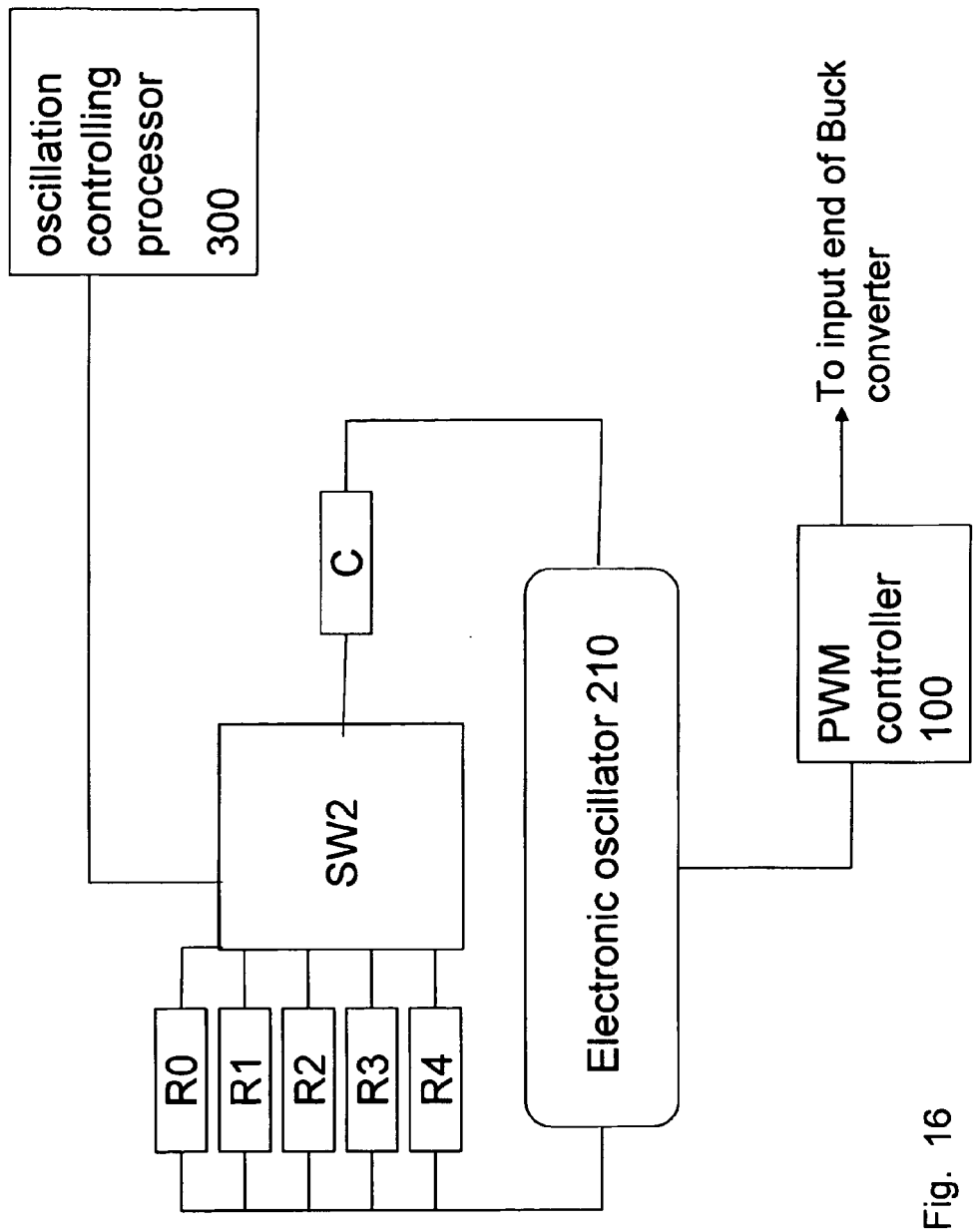
FIG. 16 shows the second operation mode for controlling the output of the buck DC-DC converter.

The second way of the present invention is illustrated in FIG. 16, in that, one end of the electronic oscillator 210 is connected with one end of a capacitor C. Another end of the capacitor C is further connected to one end of a resistor switch SW2. Another end of the resistor switch SW2 is connected to respective ends of a plurality of resistors R0 to R4 which are arranged in parallel. Another ends of the resistors R0 to R4 are connected to another end of the electronic oscillator 210. By switching the resistor switch SW2, the capacitor C is only connected to one of the resistors R0 to R1 so as to change the oscillation frequency of the electronic oscillator 210. The resistor switch SW2 is connected to the oscillation controlling processor 300. The oscillation controlling processor 300 is built with a frequency control software which includes the logics for controlling the switching of the capacitor switch SW1 based on a desired effect of the HID lamp. Furthermore, the present invention provides a function for manually adjusting output frequencies of the electronic oscillator to get a desired effect.

Figure 17:
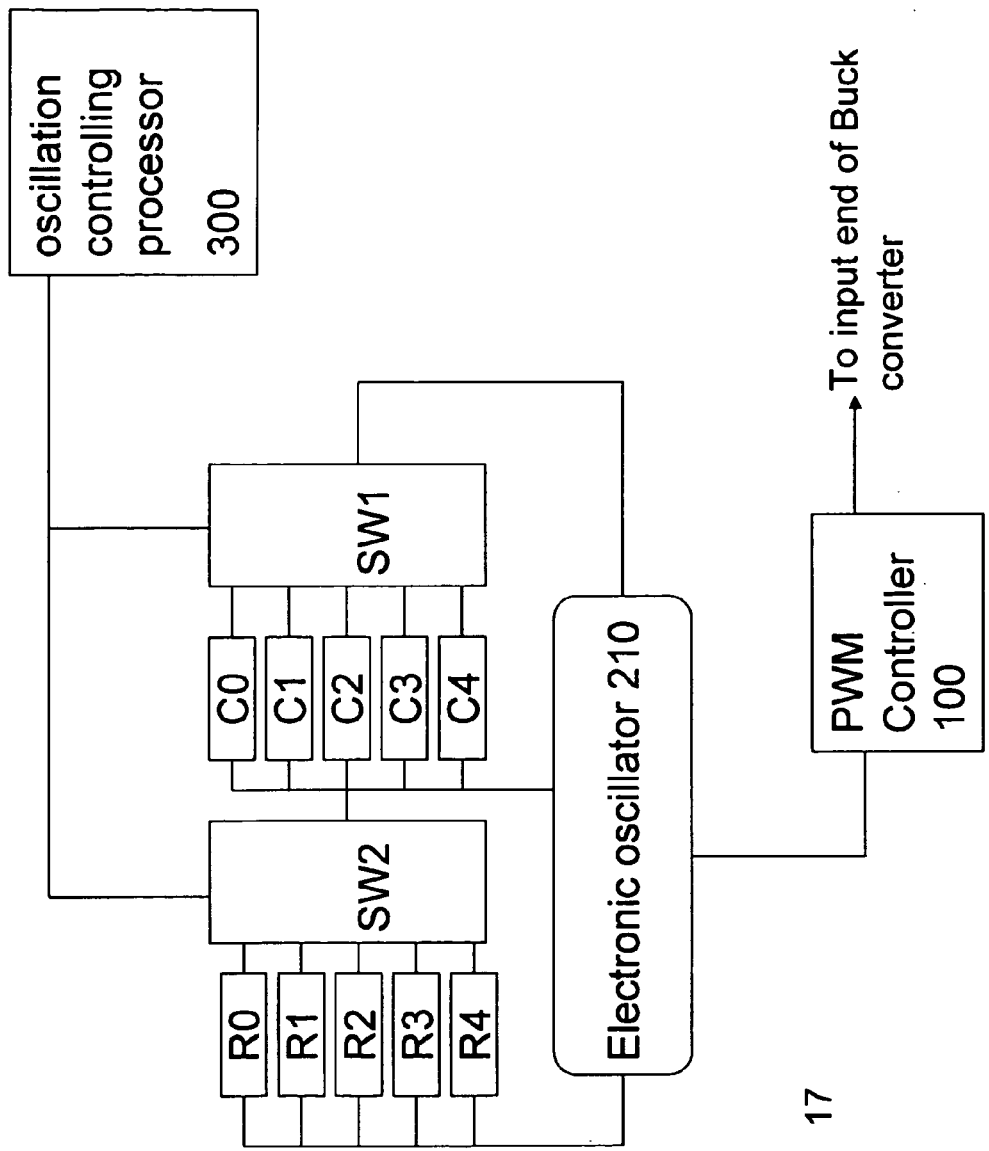
FIG. 17 shows the third operation mode for controlling the output of the buck DC-DC converter.

The third way is illustrated in FIG. 17. One end of the electronic oscillator 210 is connected to a capacitor switch SW1. The capacitor switch SW1 is further connected to respective ends of a plurality of capacitors C0 to C4. The capacitor switch SW1 cause that only one of the capacitors C0 to C4 is conducted, while other capacitors are disconnected in the circuit. Another ends of the capacitors C0 to C4 are further connected to one end of a resistor switch SW2 in parallel. Another end of the resistor switch SW2 is connected to one ends of a plurality of resistors R0 to R4. Another ends of the resistors R0 to R4 are connected to another end of the electronic oscillator 210. The resistor switch SW2 causes that only one of the resistors R0 to R4 is conducted, while other resistors are not conducted. Thus the combinations of the capacitors C0 to C4 and the resistors R0 to R4 generate many different oscillation frequencies to be provided by the electronic oscillator 210. The capacitor switch SW1 and the resistor switch SW2 are connected to the oscillation controlling processor 300. The oscillation controlling processor 300 is built with a frequency control software which includes the logics for controlling the switching of the capacitor switch SW1 based on a desired effect of the HID lamp. Furthermore, the present invention provides a function for manually adjusting output frequencies of the electronic oscillator to get a desired effect.

In the present invention, the oscillation controlling processor 300 is an MCU, a FPGA/CPLD, or other logic circuit.

Figure 18:
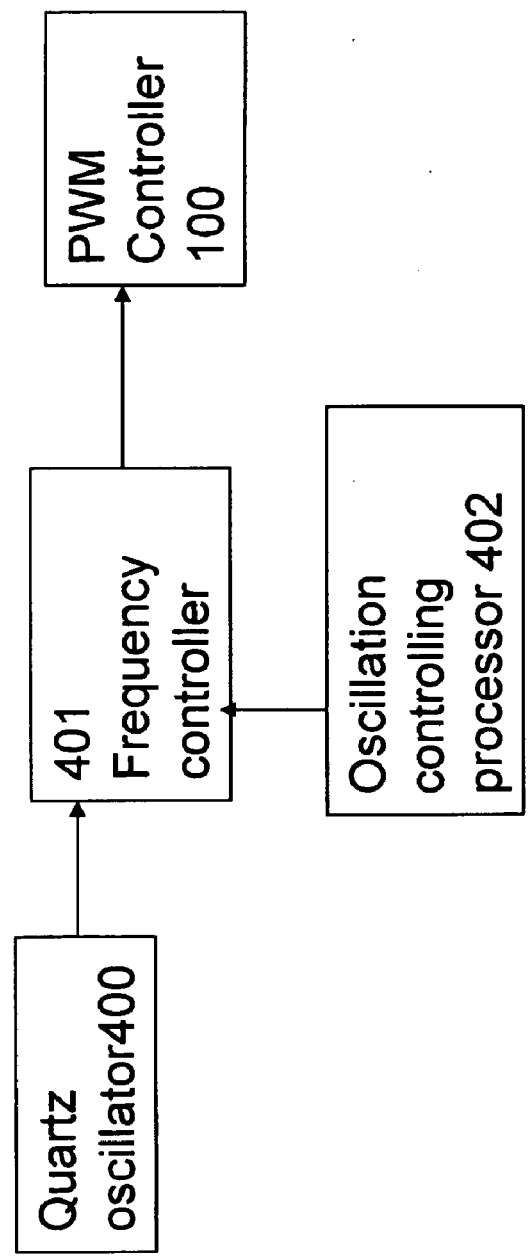
FIG. 18 shows another way for adjustment of frequency of the present invention, wherein the frequency controllable oscillator is a quartz oscillator added with a frequency controller 401.

Referring to FIG. 18, in another way of the present invention, the frequency controllable oscillator 200 is a quartz oscillator 400 and a frequency controller 401. The quartz oscillator 400 outputs a signal of fixed frequency which is further input to the frequency controller 401. The frequency controller 400 can input the fixed frequency signal from the quartz oscillator 400 and output another signal with a desired frequency. The frequency controller 401 is connected to the oscillation controlling processor 402 and the PWM controller 100.

The oscillation controlling processor 402 is built with a frequency control software which includes the logics for controlling the frequency controller 401 based on a desired effect of the HID lamp. Furthermore, the present invention provides a function for manually adjusting output frequencies of the electronic oscillator to get a desired effect.

From above analyze, it is known that the present invention provides a frequency control function to the buck DC-DC converter of an HID lamp so that change the illumination of the HID lamp.

Therefore, it only needs to add the structure of the present invention to the original HID lamp. The illumination of the HID lamp is changeable. Thus, the present invention is also made as an illumination controller.

Figure 19:
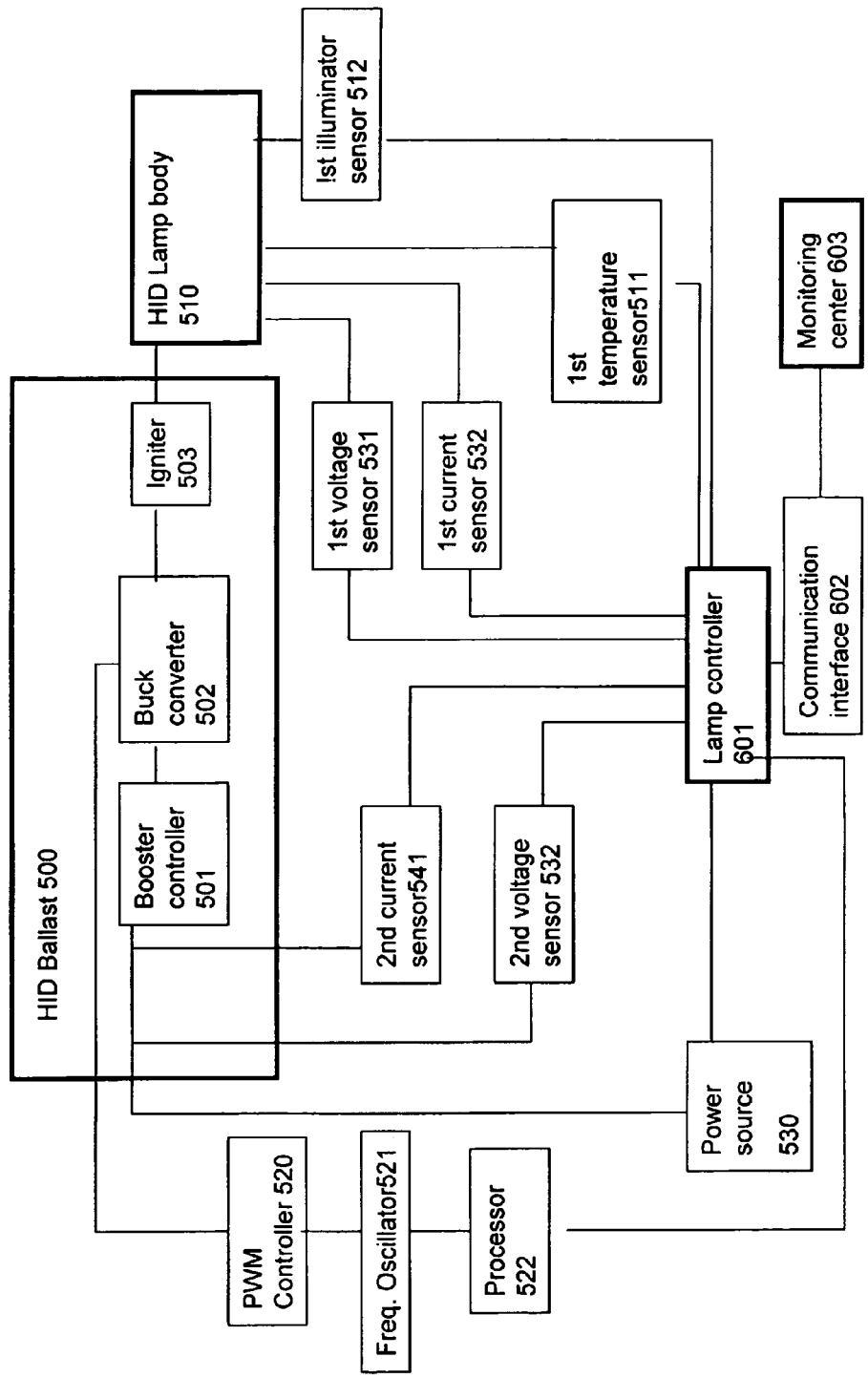
FIG. 19 shows one lamp system of the lamp according to the present invention.
Figure 20:
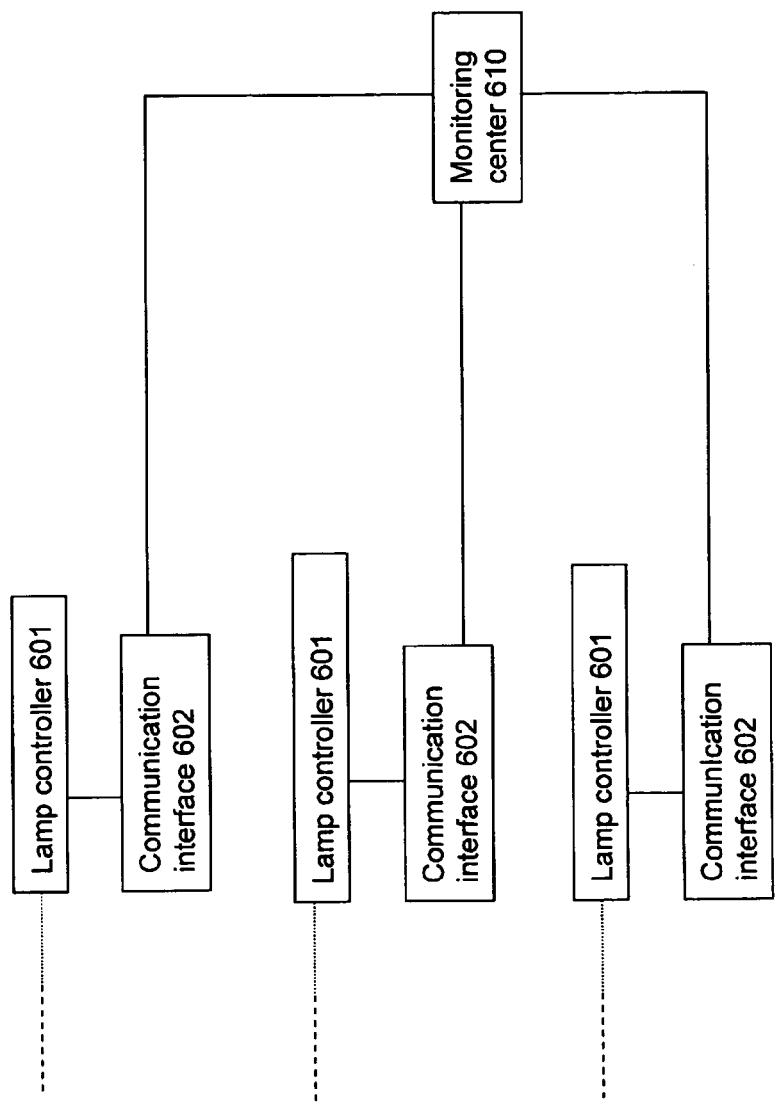
FIG. 20 shows that whole system of the present invention wherein a plurality of lamps are controlled by the system of the present invention.

Base one above mentioned structure, the present invention further provides a lamp control system for only one lamp or a plurality of lamps. In the present invention, at least one sensor and at least one related processor are added to a lamp system for adjusting the state of the lamp. The details about this system will be described herein with reference to FIGS. 19 and 20.

At least one HID lamp structure comprises the following elements.

A lamp body 510 is included.

A ballast 500 is connected to the lamp body 510. The ballast 500 includes the following elements.

An AC to DC rectified voltage booster controller 501 serves for converting AC to DC and voltage boosting based on the actuating voltage and the igniter of the HID lamp.

A buck DC-DC converter 502 with a conversion function is realized mainly by current control. The buck DC-DC converter 502 has a transistor; a gate (for MOSFET) or a base (for bipolar transistor) of the transistor being as an input end; a PWM controller 504 is installed between an output end of the lamp body and the input end of the transistor; a frequency controllable oscillator 521 and an oscillation controlling processor 522; and An igniter 503 serves for triggering the lamp body 510 to light up;

A lamp controller 601 serves for controlling the lamp body 510;

A first illumination sensor 512 is installed at the lamp body 510 and is connected to the lamp controller 601 so that the lamp controller 601 can adjust the illumination of the lamp body 510 by the sensing result from the first illumination sensor 512. Thus the lamp body 510 has a desired illumination and can achieve the object of power saving. For example, in dusk, the lamp body 510 can be in low illumination, while at night, the lamp body 510 is at a high illumination.

A first temperature sensor 511 severs for sensing the temperature of the lamp body 510 and then transferring the detected temperature signal to the lamp controller 601 so that the lamp controller 601 can adjust the duty cycle of the PWM controller 504. Moreover, if the temperature is too high, the lamp body 510 can be shut down for protecting the lamp body 510.

A first voltage sensor 531 serves for measuring the voltage difference between two ends of the lamp body 510. The first voltage sensor 531 is connected to the lamp controller 601 so that the lamp controller 601 can get the voltage for monitoring the operation of the lamp body 510.

A first current sensor 532 serves for measuring the current of the lamp body 510. The first current sensor 532 is connected to the lamp controller 601. The lamp controller 601 can have the power consumption of the lamp body 510 from the voltage of the first voltage sensor 531 and the current of the first current sensor 532.

A second voltage sensor 541 serves for measuring the input voltage of the ballast 500.

A second current sensor 542 serves for measuring the input current of the ballast 500. From the voltage of the second voltage sensor 541 and the current of the second current sensor 542, the lamp controller 601 can have the input power of the ballast 500.

A second illumination sensor 551 serves for measuring the environmental illumination at the periphery of the lamp body 510. The second illumination sensor 551 is connected to the lamp controller 601 so that the lamp controller 601 can control the illumination of the lamp body 510 based on the environmental illumination.

A communication interface 602 is connected to the lamp controller 601 for transferring signals between the lamp controller 601 and a monitoring center 610 by wired communication or wireless communication.

A monitoring center 610 is connected to all lamp controllers 601 through the communication interface 602. When more than one lamp body 510 are used, the monitoring center 602 can control all the lamp bodies 510 individually so that all the lamp bodies 510 present different effects. The effects may be illumination, temperature or power, etc.

The adjustment modes of the present invention will be described herein:

The lamp controller 601 receives the signals from the first illumination sensor 512, the first temperature sensor 511, the first voltage sensor 531, the first current sensor 532, the second voltage sensor 541, the second current sensor 542 and the second illumination sensor 551 and then control the whole lamp system based on a built in program. There are two control modes being used, which are:

A first mode: in that, the lamp controller 601 inputs adjusting signals to the oscillation controlling processor 522 so that the oscillation controlling processor 522 outputs frequency change signals to the frequency controllable oscillator 521 to cause the frequency controllable oscillator 521 outputs a desired base band signal to the PWM controller 504. Thus, the duty cycle of the PWM controller 504 is changed. This causes that output frequency and the duty cycle of the buck DC-DC converter 502 are changed. Thereby the illumination of the lamp body 510 is varied and the power of the whole system is adjusted and can be more saved in power. A further advantage of this mode is that the state of the lamp body 510 can be detected at any time and thus in need, the lamp body 510 can be operated in overload state through a short time period.

The second mode of the present invention is that the lamp controller 601 directly turns off or turns on the power source 530 so as to have the object of turning on or turning off the lamp body 510.

By above mentioned two modes, the objects of light strength control, temperature control, auto-turning on and off of the HID lamp, power control and time and illumination control are achieved.

In the present invention, the lamp controller 601 and the oscillation controlling processor 522 can be integrated as one element.

Furthermore, in the present invention, the lamp controller further has a plurality of expanding terminals, such as input/output (I/O) terminals, AC to DC or DC to AC terminals, communication terminals (such as SPI, I2C, UART, USB, etc.) so that the present invention can be connected to other devices, such as alert systems or monitoring systems, etc. For example the density of $CO_2$, room temperature, wetness, or fire can be detected. Moreover, when the lamp body 510 of the present invention is used outdoors, the lamp body 510 can be connected to a solar energy system or wind power system, or other regeneration system so as to integrate these regeneration power system and thus to monitor each lamp body in the regeneration power system and monitor power storage state.

The above mentioned functions are achieved by modifying the internal firmware in the processor of the lamp controller. Thus the application is flexible.

It should be noted here, in dimming control, the HID lamp has a preheat period of about 5 to 15 minutes after once the HID lamp is started. The dimming control is performed after this time period. Furthermore, the preheat period is varied based on the manufacturers. Thus the controller (based on power or illumination) initiates the dimming control after the preheat period (that is, the HID lamp is in full power operation), while this is performed based on the manufacturers.

Advantages of the present invention are that: (1) The structure of the ballast of the HID lamp is unnecessary to be modified. The power of the ballast is used directly. (2) The illumination sensors have the functions of power control, but no extra processor is needed. (3) Many intellectual functions, such as light strength control, temperature control, auto-turning on and off of the HID lamp, power control and time and illumination control may be achieved by the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lamp control system mainly by controlling outputs of a buck DC-DC converter; comprising:
   at least one lamp structure; comprising:
      a lamp body;
      a ballast connected to the lamp body; the ballast including:
         a first stage for converting AC current into DC current and boosting of voltage;
      a buck DC-DC converter; a transistor of the buck DC-DC converter having an input end which is selected from a gate for MOSFET and a base for a bipolar transistor; a PWM controller being installed between an output end of the lamp body and the input end of the transistor; a frequency controllable oscillator being connected to the PWM controller for providing variable frequency to the PWM controller and an oscillation controlling processor being connected to the frequency controller oscillator for generating instructions to change the oscillation frequency of the frequency controller oscillator and thus to adjust the modulation frequency of the output of the PWM controller; and
      an igniter for triggering the lamp body to light up; and
   a lamp controller for controlling the lamp body;
   a first illumination sensor connected to the lamp controller so that the lamp controller can adjust the illumination of the lamp body.

2. The lamp control system as claimed in claim 1, further comprising:
   a first temperature sensor for sensing the temperature of the lamp body and then transferring sensed temperature signals to the lamp controller so that the lamp controller can adjust the duty cycle of the PWM controller; if the temperature is too high, the lamp body be shut down for protecting the lamp body.

3. The lamp control system as claimed in claim 1, further comprising:
   a first voltage sensor for measuring the voltage difference between two ends of the lamp body; the first voltage sensor being connected to the lamp controller so that the lamp controller can get the voltage for monitoring the operation of the lamp body; and
   a first current sensor for measuring the current of the lamp body; the first current sensor being connected to the lamp controller; the lamp controller calculating power consumption of the lamp body from the voltage of the first voltage sensor and the current of the first current sensor.

4. The lamp control system as claimed in claim 1, further comprising:
   a second voltage sensor for measuring the input voltage of the ballast;
   a second current sensor for measuring the input current of the ballast;
   and from the voltage of the second voltage sensor and the current of the second current sensor, the lamp controller calculates the input power of the ballast.

5. The lamp control system as claimed in claim 1, further comprising:
   a monitoring center connected to the lamp controller through the communication interface; when more than one lamp body are used, the monitoring center can control all the lamp bodies individually so that all the lamp bodies present different effects; and
   a communication interface connected to the lamp controller for transferring signals between the lamp controller and a monitoring center by wired communication or wireless communication.

6. The lamp control system as claimed in claim 1, wherein the frequency controllable oscillator is formed by an electronic oscillator and an adjusting circuit; the electronic oscillator is an electronic oscillation circuit; and the adjusting circuit includes at least one resistor and at least one capacitor; and at least one switch is used to switch the resistor and the capacitor so as to form with different assembly of the at least resistor and the at least one capacitor for adjusting the frequency of the electronic oscillator.

7. The lamp control system as claimed in claim 1, wherein the frequency controllable oscillator is a quartz oscillator and a frequency controller; the quartz oscillator outputs a signal of fixed frequency which is further input to the frequency controller; the frequency controller inputs the fixed frequency signal from the quartz oscillator and output another signal with a desired frequency; the frequency controller is connected to the oscillation controlling processor; and the frequency controller is connected to the PWM controller.

8. The lamp control system as claimed in claim 1, wherein the ballast further includes a DC to AC converter which is connected between the buck DC-DC converter and the igniter.

9. The lamp control system as claimed in claim 1, further comprising
   a second illumination sensor for measuring the environmental illumination at the periphery of the lamp body; the second illumination sensor being connected to the lamp controller so that the lamp controller can control the illumination of the lamp body based on the environmental illumination.

10. The lamp control system as claimed in claim 1, wherein the lamp controller includes at least one expanding terminal.

11. The lamp control system as claimed in claim 1, wherein the expanding terminal is selected from one of an input/output (I/O) terminals, an AC to DC, a DC to AC terminals, and a communication terminal.

* * * * *